Jan. 24, 1950     E. W. SPRINGER     2,495,296
AIRWAY TRAFFIC INDICATOR

Filed Nov. 5, 1947     2 Sheets-Sheet 1

INVENTOR:
EARL W. SPRINGER
BY
ATT'Y

Jan. 24, 1950   E. W. SPRINGER   2,495,296
AIRWAY TRAFFIC INDICATOR

Filed Nov. 5, 1947   2 Sheets-Sheet 2

INVENTOR:
EARL. W. SPRINGER
BY
*M. O. Hayes*
ATT'Y

Patented Jan. 24, 1950

2,495,296

UNITED STATES PATENT OFFICE 2,495,296

AIRWAY TRAFFIC INDICATOR

Earl W. Springer, Indianapolis, Ind.

Application November 5, 1947, Serial No. 784,208

13 Claims. (Cl. 177—352)

(Granted under the act of March 3, 1883, as amended April 30, 1928; 370 O. G. 757)

This invention relates to an airway traffic indicator and is more particularly described as an electro-mechanical means for plotting and showing the positions and movement of aircraft or ships relative to a base by projecting a distinguishable image upon a screen which represents the ocean surrounding a ship or a map of territory including a base.

An important object of the invention is to provide means for projecting and moving a spot of light, representing a ship or aircraft, on a translucent screen having drawn or printed thereon a chart or map of the area surrounding an airport, or representing the space around a ship or an aircraft carrier.

A further object of the invention is to provide means for indicating the position, direction of movement, height and rate of movement of an aircraft upon a screen representing a pertinent area.

Still a further object of the invention is to provide means for easily and quickly varying the position of any light spot representing a ship or aircraft, and changing the speed, height, and direction of movement indications of the spot upon the screen.

Other objects of the invention will appear in the specification and will be apparent from the accompanying drawings, in which, Fig. 1 is a diagrammatical representation of an airway traffic indicator assembly, in accordance with this invention;

Although it may have been proposed, heretofore, to represent the positions, directions and other indications of flight or movements of ships upon a transparent or translucent chart, the changes in position have required almost constant attention and manual adjustment to be of value in indicating the position and movement of a ship, or the like. The present invention provides means for accurately setting the position and varying the speed of movement as well as the direction and other indicated changes such as altitude, or designation of the ship may also be easily and quickly made with reference to a visible chart.

Figure 1:
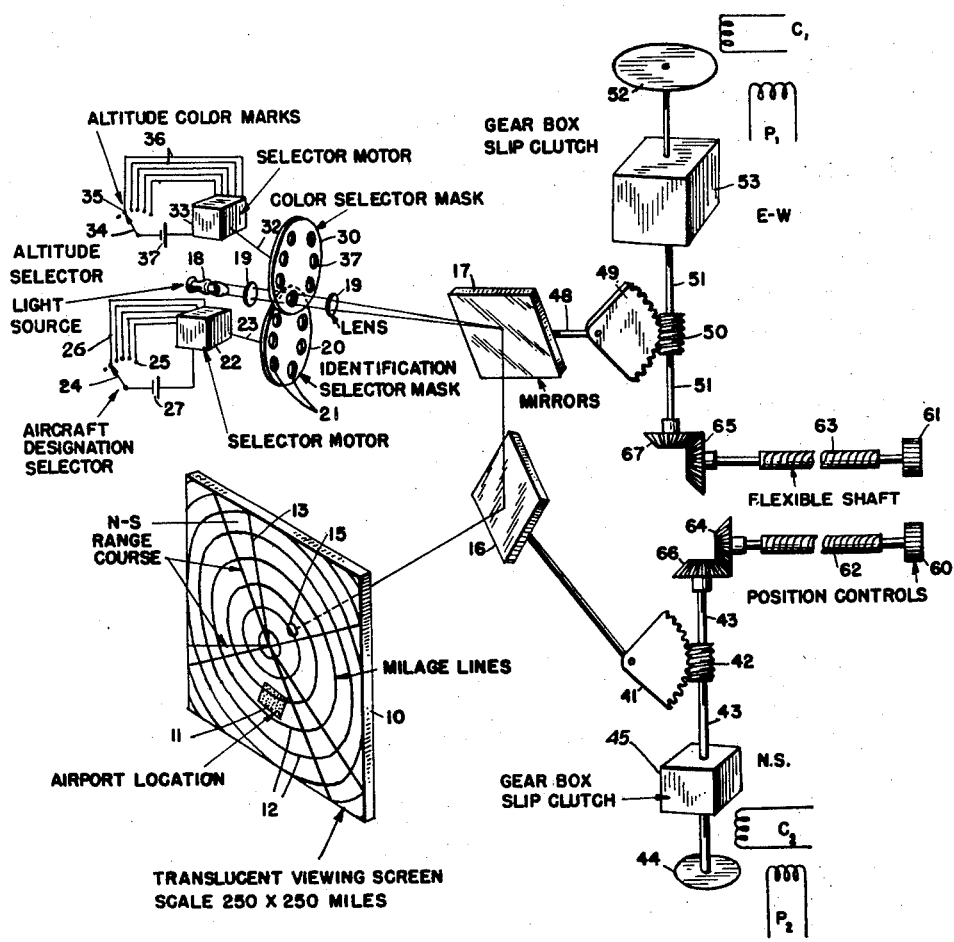

Referring now more particularly to Fig. 1 of the drawings, a translucent viewing screen 10 is represented as having an airport 11 (or a ship) located somewhat centrally of the screen, with a map, chart, or milage zones 12 of the area, and with radio range courses 13, or other suitable indications such as landmarks drawn or printed upon the screen to proper scale.

A spot 15 of light is positioned upon the screen by reflection from mirrors 16 and 17 and from a suitable light source 18, representing an airplane (or a ship) approaching or moving away from the airport 11 or in some other direction. To designate aircraft identification a rotable selector mask disc 20 having numbered transparent holes 21 with opaque numbers or characters therein is interposed in the light path from the light source 18, the designating number appearing upon the screen 10. A stop motor 22 is connected by a shaft 23 with the disc 20 and has associated switching means comprising a selector arm 24 manually movable over contacts 25 connected by separate conductors 26 to the motor and through a suitable battery 27 or other source of power for driving the motor.

An altitude selector and code designator may also comprise a color mask disc 30 having openings 31 therethrough with different colored masks in the openings. For example, a red mask may indicate an altitude of 500 feet or below; yellow, between 500 and 1000 feet; green, above 2000 feet and so forth. This disc is rotated by a shaft 32 extending to a stop motor 33 having connected switching means comprising a selector arm 34 manually movable over contacts 35 connected by conductors 36 to the motor and through a suitable battery 37 or other sources of power for driving the motor. The openings of this light mask are also selectively rotatable into the light path from the light source lenses 19 and the light spot 15 appearing upon the screen will be colored correspondingly to designate the altitude of the airplane to which it relates.

Figure 2:
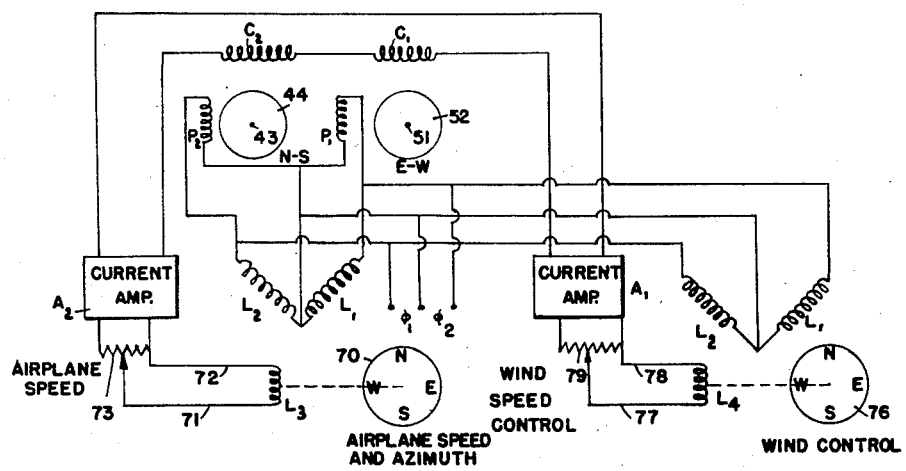
Fig. 2 is a wiring diagram for the indicator assembly of Fig. 1.

Each of the mirrors 16 and 17 is separately adjustable and is rotated on an axis substantially at right angles to the other by an independent watt-hour type of motor movement at a speed in accordance with the movement of the ship to which each indicator relates, to produce a corresponding movement of the light spot 15 on the screen 10. The mirror 16 may be designated as the N–S motivator, and the mirror 17 as the E–W motivator. A shaft 40 is connected to the mirror 16 for turning it and this shaft is the axis of a segmental gear 41 secured thereto which is engaged and moved to rock the mirror 16 accordingly by a pinion 42 secured to a shaft 43 extending to a motor disc 44 through a gear box and slip clutch 45. This disc 44 represents a motor of the wattmeter type which is driven by the motor coils $C_2$ and $P_2$ at right angles to each other, receiving current, as represented in Fig. 2 from different phases of an alternating current supply.

Similarly, the mirror 17 is connected to a shaft 48 which is also the axis of a segmental gear 49 engaging a pinion 50 on a shaft 51. This shaft 51 extends to a motor disc 52 through a gear box and slip clutch 53. The disc 52 is driven by different phase coils $C_1$ and $P_1$ electrically connected as shown in Fig. 2.

Each of the mirrors may be independently adjusted, repositioned and set by reason of its slip clutch, and by means of a setting knob 60 or 61 connected by a flexible shaft 62 or 63 with a bevel gear 64 or 65 which meshes with a bevel gear 66 or 67, respectively on shaft 43 or 51. Turning either position control knob rotates the corresponding gear segment 41 or 49 and the mirror connected therewith, without imposing undue strain upon the disc drive gear train because of the slip clutch 45 or 53.

Thus the colored spot of light with a numerical designation thereon may be set or repositioned at will and moved in accordance with the set direction and speed of movement. Although one pair of such meter movements with the associated light source and optical system is shown in Fig. 1, any required number of such assemblies may be used as necessitated by the traffic load at the airport or other station where the indicators are used.

A diagrammatic arrangement of the two watt-hour type of meter movements is shown in Fig. 2, with the current coils $C_1$ and $C_2$ for the two disc motors 44 and 52 connected in series between current amplifiers $A_1$ and $A_2$. Corresponding potential coils $P_1$ and $P_2$ for the two motors are connected across phase one ($\phi_1$) and phase two ($\phi_2$) of a source of alternating current 60 cycle power.

An azimuth control, or phase shifter, comprises two sets of coils $L_1$ and $L_2$ connected in quadrature in phases one and two of the source of current supply, for applying a variable potential to the motor winding coils $P_1$ and $P_2$ of the watt-hour motors. One set of coils $L_1$ and $L_2$ has an inductively related coil $L_3$ mounted for relative rotatable movement by manually turning an indicator dial 70 attached thereto, the coil $L_3$ connected by conductors 71 and 72 through a variable resistance 73 with the current amplifier $A_2$. The other set of coils $L_1$ and $L_2$ has an inductively related coil $L_4$ mounted for relative rotatable movement by manually turning an indicator dial 76 attached thereto, the coil $L_4$ connected by conductors 77 and 78 through a variable resistance 79 with the current amplifier $A_1$.

One variable resistance 73 may be adjusted for airplane (or ship) speed, and the other variable resistance 79 may be adjusted for wind speed control as it affects the airplane.

In operation, the current amplifier outputs are connected to the coils $C_1$ and $C_2$ for motor discs 52 and 44 respectively, and when coil $L_3$ is fully coupled, for example, to coil $L_1$ the east-west (E–W) motor (disc 52) will run at maximum speed, while the north-south (N–S) motor (disc 44) will remain stationary due to the quadrature relation of the induced fields from the coils $C_2$ and $P_2$.

If the coil $L_3$ is reversed in position 180 degrees with respect to coil $L_1$ the east-west motor will run in the opposite direction but at the same speed. For intermediate positions of the coil $L_3$, the east-west and north-south motors will be caused to rotate at proportional speeds in accordance with the angular positions of the coil. The coil $L_4$ is similarly movable and adjustable with respect to its coils $L_1$ and $L_2$ for the purpose of modifying the airplane speed due to the wind direction and the wind speed is changed by the resistance 79. By this means the associated motors will be driven at such speeds as to properly represent the vector sum of the airplane and wind direction and velocity.

In using this device a number is assigned to an airplane or a flight approaching the control area. This airplane reports by radio that it is in a position 90 miles out on the north-south range course, at an elevation of 2000 feet, and flying at a ground speed of 210 miles per hour. Upon receipt of this information, the traffic control operator will set up the traffic indicator to the reported position with a determined number designation, the color green, with the speed and the course as reported. At a later time, if a report comes in from this airplane or another source, and the recorded position does not agree with the indicated position on the traffic indicator, then by means of the position controls, Fig. 1, the indicated position may be corrected to agree with the most recent report. If the airplane descends to a lower altitude, say 500 feet, the altitude selector will be shifted changing the image to the color red.

Figure 4:
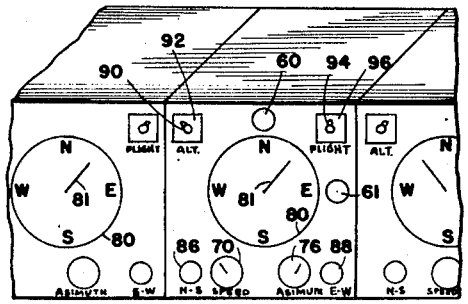
Fig. 4 is a perspective of a portion of a bank of control units for use with a traffic indicator assembly as shown in Fig. 1.

A suggested form of the control unit for the indicator is shown in Fig. 4, one unit for each image projector assembly. These may be variously grouped for different installations and usually several units are placed together for control by a single operator. Each unit may have a composite directional indicator 80 with an arm 81 positioned as the result of the adjustment of the control arms of various control dials; ship direction dial 70 for turning coil $L_3$, wind direction dial 76 for turning coil $L_4$, ship speed dial 86 for adjusting resistance 73, and wind speed dial 88 for adjusting resistance 79. The altitude representation is controlled by moving an arm 90 connected with stop motor selector arm 34 over an altitude dial 92, and the flight designation is controlled by an arm 94 connected with stop motor selector arm 24 and movable over a flight dial 96. The setting knob 60 for the N–S mirror and 61 for the E–W mirror are also commonly located in the control unit for easy access by the operator. If the locations of these units are at such a distance as to make direct or flexible shafting connections between the controlling dials and the respective adjusted parts impracticable, then other remote indicating, transmitting and control means such as synchro repeaters and the like may be used.

Figure 3:
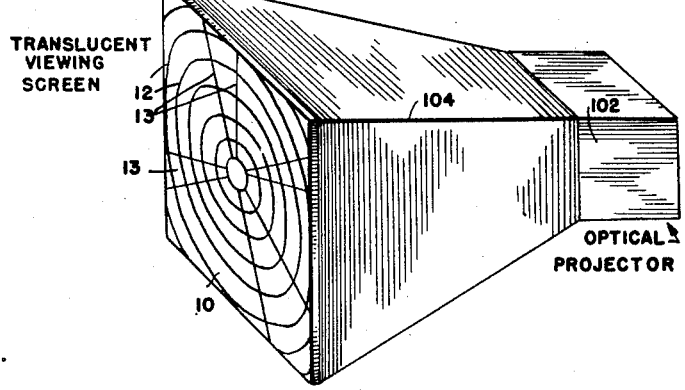
Fig. 3 is a perspective of a typical projector screen as used.

A screen or projection map may take any of several forms; if it is desired to plot the positions of the various images on the screen, it may have a rough surface or a photo-surface paper may be used which would develop under the effect of light from the projected image. A large room sized screen may be used if the images are to be viewed by a number of people. In Fig. 3 an enclosed type is shown which may be mounted on a traffic tower operating desk. It comprises a translucent screen 10 which may have range courses 13 and milage zones 12, and suitable landmarks. An optical projector system as diagrammatically illustrated in Fig. 1 is connected and positioned with respect to the screen so that an enclosing casing therefor comprising a projection box 102 is connected to the smaller end of an expanding and outwardly flaring housing 104 which has the screen 10 at its outer and larger end, where the screen and the markings thereon may be viewed from the outside.

For observing and plotting the positions of ships or aircraft relative to a particular ship, such as an aircraft carrier, this traffic indicator may be used aboard ship by using motor drives and optical systems and representing on the screen the ocean or area surrounding the home ship. The watt-hour meter motors for this drive will have the speed controlled by the ship speed and the azimuth controlled by the ships gyro compass.

With this system and apparatus the indicator may be accurately set for direction and speed and quickly adjusted for any change or variation. Information may be derived from the approaching (or departing) air ships and from known conditions to make any necessary changes. Each ship or flight may be distinguished and its elevation may be changed upon the same spot which shows its path and movement over the screen without affecting any other indications.

While a preferred construction and method of operation has been described in some detail, it should be regarded as an illustration or example rather than a restriction or limitation of the invention, as various changes may be made in the construction, combination and arrangement of the parts without departing from the spirit and scope of the invention.

The invention described herein may be manufactured and used by or for the Government of the United States of America for government purposes without the payment of any royalties thereon or therefor.

I claim:

1. In a traffic indicator, a screen, means for projecting a light ray upon the screen, a plurality of discs each intercepting the light ray at one edge, the discs being opaque but having transparent openings which may be aligned with the light ray, opaque designations in the openings which appear in the light projected upon the screen, and stop motor means to position any opening of any disk in line with the light ray.

2. In a traffic indicator, a screen, means for projecting light rays in a spot upon the screen, a plurality of discs overlapping the light rays at one edge, each disc having a plurality of transparent openings and some with opaque designations therein, movable to position any opening in the path of the light rays, and stop motor means operable to move each disc independently to position any selected opening in the path of the light ray, the designation in the opening being reproduced in the light spot upon the screen.

3. In an airway traffic indicator, a screen, means for projecting light rays in a spot upon the screen, a plurality of opaque discs to intercept the light rays each having openings therein one with transparent colors and another with opaque designations therein which appear in the light spot on the screen when the light rays are directed through the openings of both discs, different colors denoting different altitudes and different designations denoting different air ships or flights, and a separate motor means for moving each disc to position any one of the different openings in the path of the light rays, and the color and other designations appearing on the same spot on the screen.

4. In a traffic indicator for ships and air ships, a screen having a map and landmark indications, means for projecting light rays in a spot upon the screen, a plurality of opaque discs to intercept the light rays each having openings therein one with different colors and another with opaque designations therein which appear in the light spot on the screen when the light rays are directed through the openings, different colors denoting different altitudes for airships and other designations denoting different airships or flights, a separate motor for moving each disc to position any selected one of the different openings into the path of the light rays, and means comprising a pair of mirrors and means to move them jointly and separately to deflect the rays and to continuously change them in moving the spot on the screen to indicate the direction and speed of movement of the airship.

5. In a directional airway traffic indicator, a screen having a map thereon, means for projecting rays of light to form a spot on the screen, a pair of movable mirrors for moving the spot directionally upon the screen, an electric motor for each mirror, either mirror movable at an angle to the other, a two phase current supply with one motor field in one phase and the other motor field in the other phase, and directional means for operating the motors comprising induction coils in quadrature with relation to each other and connected to the motor fields, and a rotatable induction coil movable relatively to the said induction coils to actuate either one or both of the motors accordingly and thereby to move the mirrors jointly and separately and the spot of light in the resultant directional path on the screen.

6. In a directional airway traffic indicator, a screen having a map thereon, means for projecting rays of light to form a spot on the screen, a pair of movable mirrors for moving the spot directionally upon the screen, an electric motor for each mirror, either mirror movable at an angle to the other, a two phase current supply with one motor field in one phase and the other motor field in the other phase, and directional means for operating the motors comprising induction coils in quadrature with relation to each other and connected to the motor fields, a rotatable induction coil movable relatively to the said induction coils to actuate either one or both of the motors accordingly and thereby to move the mirrors and the spot of light in a resultant directional path on the screen, and speed changing means for the motors comprising motor current coils in series and connected to the rotatable induction coil through a variable resistance, the variation of the resistance changing the speeds of the motors and the corresponding movements of the mirrors changing the speed of movement of the spot of light in the resultant directional path on the screen.

7. In a directional airway traffic indicator, a screen having a map thereon, means for projecting rays of light to form a spot on the screen, a pair of movable mirrors for moving the spot directionally upon the screen, an electric motor for each mirror, either mirror movable at an angle to the other, a two phase current supply with one motor field in one phase and the other motor field in the other phase, and directional means for operating the motors comprising two sets of induction coils in quadrature and connected to the motor fields, an induction coil movable relatively to the coils of one set of induction coils to modify the fields of either one or both of the motors according to the reported direction of movement of a ship and another induction coil movable relatively to another set of induction coils to modify the fields of either one or both of the motors according to the reported direction of the wind, the motors operating the mirrors accordingly and moving the spot of light on the screen in a path which is a resultant of the ships reported direction and the direction of the wind.

8. In a directional airway traffic indicator, a screen having a map thereon, means for projecting rays of light to form a spot on the screen, a pair of movable mirrors for moving the spot directionally upon the screen, an electric motor for each mirror, either mirror movable at an angle to the other, a two phase current supply with one motor field in one phase and the other motor field in the other phase, and directional means for operating the motors comprising two sets of induction coils in quadrature and connected to the motor fields, an induction coil movable relatively to the coils of one set of induction coils to modify the fields of either one or both of the motors according to the reported direction of movement of a ship, another induction coil movable relatively to another set of induction coils to modify the fields of either one or both of the motors according to the reported direction of the wind, the motors operating the mirrors accordingly and moving the spot of light on the screen in a path which is a resultant of the ship's reported direction and the direction of the wind, and speed changing means for the motors comprising motor current coils in series and connected to each of the movable induction coils through a variable resistance, the variation of the resistances changing the speeds of the motors and the resultant speeds of the motors depending upon the reported speeds of the ship and the wind, the motors operating the mirrors in accordance with the variations of the movable induction coils and the resistances to move the spot of light on the screen which is a resultant of the reported speed and direction of the ship and of the wind.

9. In a traffic indicator of the class described, a screen having a map thereon, means for projecting light rays in a spot on the screen, a pair of movable mirrors for deflecting the rays and directionally moving the spot on the map of the screen; means for driving each mirror comprising a motor, a gear segment connected to the mirror, and a driving connection between the motor and the gear segment including a slip clutch; and means to actuate each gear segment independently of the motor movement for moving each mirror to reset the spot at a different location.

10. In a traffic indicator of the class described, a screen having a map thereon, means for projecting light rays in a spot on the screen, a pair of movable mirrors for deflecting the rays and directionally moving the spot on the map of the screen; means for driving each mirror comprising a motor, a gear segment connected to the mirror, and a driving connection between the motor and the gear segment including a slip clutch; and means to set the spot at a predetermined location on the map by moving either one or both of the mirrors and each comprising a manually operable knob and a connection from the knob to the gear segment, the slip clutch operating to protect the motor drive to the gear segment.

11. In a traffic indicator of the class described, a screen having a map thereon, means for projecting light rays in a spot on the screen, a pair of movable mirrors for deflecting the rays and directionally moving the spot on the map of the screen; means for driving each mirror comprising a motor, a gear segment connected to the mirror, a pinion engaging the gear segment, a driving shaft for the pinion, a slip clutch normally connecting the motor and the driving shaft; and means to independently set each mirror comprising a manually operable knob, and a connection between the knob and the driving shaft for the pinion to operate the gear segment separately from the motor movement because of the slip clutch, the spot on the screen being moved and set accordingly.

12. In a traffic indicator of the class described, a screen having a map thereon, means for projecting light rays in a spot on the screen, means to modify the light rays and impart different colors to the spot to indicate different flight altitudes, means to modify the light rays and apply different numerals to the light spot to indicate different ships, a pair of movable mirrors for deflecting the rays and directionally moving the spot on the map of the screen, means for moving each mirror comprising a gear segment connected thereto, a pinion engaging the segment, a shaft to which the pinion is connected, a driving motor for each mirror, a slip clutch normally connecting each motor with its corresponding shaft, and means for independently setting each mirror and adjusting the spot accordingly comprising a manually operable knob, and a driving connection between the knob and the shaft for separately rotating the pinion and the gear segment for the mirror free from the motor movement because of the slip clutch.

13. In a traffic indicator for ships and air ships, means for projecting light rays, a screen having a map and landmark indications, and means to receive and direct the light rays upon the screen comprising a pair of mirrors movable at different angles with respect to each other, and motor means connected with the mirrors for jointly and separately moving them to deflect the light rays in a spot on the screen and to change them continuously for moving the spot in any desired direction to indicate the direction and speed of movement of the ship.

EARL W. SPRINGER.

REFERENCES CITED

The following references are of record in the file of this patent:

UNITED STATES PATENTS

| Number | Name | Date |
| --- | --- | --- |
| 1,985,265 | Smith | Dec. 25, 1934 |
| 2,433,860 | McDowell | Jan. 6, 1948 |

FOREIGN PATENTS

| Number | Country | Date |
| --- | --- | --- |
| 460,997 | Great Britain | Feb. 8, 1937 |
| 473,024 | Great Britain | Oct. 4, 1937 |